(12) United States Patent
Kawashima et al.

(10) Patent No.: US 8,422,118 B2
(45) Date of Patent: Apr. 16, 2013

(54) PLC-TYPE DELAY DEMODULATION CIRCUIT

(75) Inventors: Hiroshi Kawashima, Tokyo (JP);
Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/333,432

(22) Filed: Dec. 21, 2011

(65) Prior Publication Data
US 2012/0154901 A1 Jun. 21, 2012

Related U.S. Application Data

(63) Continuation of application No. PCT/JP2011/057577, filed on Mar. 28, 2011.

(30) Foreign Application Priority Data

Mar. 30, 2010 (JP) ................................. 2010-077634

(51) Int. Cl.
*G02F 2/00* (2006.01)
(52) U.S. Cl.
USPC ...................... 359/325; 385/8; 385/9; 385/14
(58) Field of Classification Search .................. 385/1–9, 385/14, 129–132; 359/237, 325; 398/205, 398/214; 375/324, 350
See application file for complete search history.

(56) References Cited

U.S. PATENT DOCUMENTS

| 5,943,452 | A | 8/1999 | Himeno |
| 6,961,492 | B2 * | 11/2005 | Doerr .............................. 385/39 |
| 6,985,657 | B2 | 1/2006 | Nakagawa |
| 7,259,901 | B2 * | 8/2007 | Parsons et al. ................ 359/237 |
| 7,480,091 | B2 * | 1/2009 | Hasegawa et al. ............ 359/325 |
| 7,860,408 | B2 | 12/2010 | Isomura |

(Continued)

FOREIGN PATENT DOCUMENTS

| JP | 10-104446 | 4/1998 |
| JP | 2000-162454 | 6/2000 |

(Continued)

OTHER PUBLICATIONS

U.S. Appl. No. 13/336,111, filed Dec. 23, 2011, Kawashima, et al.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

A PLC-type delay demodulation circuit includes a planar lightwave circuit that is provided on one PLC chip and demodulates a DQPSK signal. The planar lightwave circuit includes a Y-branch waveguide that branches a DQPSK-modulated optical signal into two optical signals and first and second MZIs that delay the branched optical signals by one bit. The length of a short arm waveguide of the first MZI is different from the length of a short arm waveguide of the second MZI, and the length of an optical path from the Y-branch waveguide to output ports of the first MZI through the short arm waveguide of the first MZI is equal to that of an optical path from the Y-branch waveguide to output ports of the second MZI through the short arm waveguide of the second MZI.

13 Claims, 8 Drawing Sheets

U.S. PATENT DOCUMENTS

| | | | |
|---|---|---|---|
| 7,899,279 B2 * | 3/2011 | Nasu et al. | 385/14 |
| 7,961,991 B2 * | 6/2011 | Hasegawa et al. | 385/14 |
| 7,978,401 B2 | 7/2011 | Hasegawa | |
| 2010/0104237 A1 | 4/2010 | Nasu | |

FOREIGN PATENT DOCUMENTS

| | | |
|---|---|---|
| JP | 2007-201939 | 8/2007 |
| JP | 2009-244483 | 10/2009 |
| WO | WO2004/077117 A1 | 9/2004 |
| WO | WO2008/084707 A1 | 7/2008 |

OTHER PUBLICATIONS

U.S. Appl. No. 13/409,343, filed Mar. 1, 2012, Inoue, et al.
U.S. Appl. No. 13/409,556, filed Mar. 1, 2012, Inoue, et al.
International Search Report mailed on Jun. 21, 2011, issued for PCT/JP2011/057577, filed on Mar. 28, 2011.
Hashimoto, Toshikazu, et al.: "Compact DQPSK Demodulator with Interwoven Double Mach-Zehnder Interferometer using Planar Lightwave Circuit", ECOC 2008 Sep. 12-25, 2008 Proceeding, Mo.3.C.2.

* cited by examiner

PLC-TYPE DELAY DEMODULATION CIRCUIT

BACKGROUND OF THE INVENTION

1. Field of the Invention

The present invention relates to a PLC-type delay demodulation circuit including a planar lightwave circuit that is formed on one PLC chip and demodulates a DQPSK modulated optical signal.

2. Description of the Related Art

In a 40 Gbps DQPSK communication system, as a method of configuring a delay circuit that demodulates a DQPSK (Differential Quadrature Phase Shift Keying)-modulated signal (optical signal) in a PLC, a method has been proposed which configures the delay circuit including an optical splitter and two MZIs (for example, see Hashimoto, Toshikazu, et al., "Compact DQPSK Demodulator with Interwoven Double Mach-Zehnder Interferometer using Planar Lightwave Circuit," ECOC 2008 Proceeding, Mo.3.C.2). In the device, it is necessary to reduce the size of a module, power consumption, and polarization dependence and obtain uniform MZI characteristics.

Bits of the optical signals that have been modulated by the delay circuit and then output from four output ends need to be input to four light receiving elements substantially at the same time. Therefore, the lengths of the optical paths from the optical splitter to the four output ends need to be exactly equal to each other.

In order to meet the requirements and solve the problems, a technique for designing a circuit to reduce the size of a chip has been proposed (for example, see Japanese Patent Application Laid-Open (JP-A) No. 2009-244483). In the technique disclosed in JP-A No. 2009-244483, as shown in FIG. 12, in a DQPSK delay circuit including an optical splitter 3 and two MZIs 4 and 5, the two MZIs are formed so as to overlap each other in the same region, in order to reduce the size of the DQPSK delay circuit.

However, in the technique disclosed in JP-A No. 2009-244483, in order to make the lengths of the optical paths from the optical splitter 3 to the four output ends equal to each other, the MZIs 4 and 5 are designed such that the distances from the optical splitter 3 to input couplers 6 and 10 of the MZIs 4 and 5 are equal to each other, the lengths of short delay lines 9 and 13 of the MZIs are equal to each other, and the distances from output couplers 7 and 11 of the MZIs to the output ends are equal to each other. Therefore, the flexibility of the design is reduced and there are restrictions in reducing the size or setting the positions of the input and output ends. In addition, the delay lines need to intersect each other at four points, that is, the arm waveguides 8 and 9 of the MZI 4 need to intersect the arm waveguides 12 and 13 of the MZI 5 at four points, and it is difficult to increase the intersection angle between the arm waveguides, which results in an increase in loss.

The invention has been made in order to meet the requirements and solve the above-mentioned problems, and proposes the layout of a new PLC-type delay demodulation circuit. An object of the invention is to provide a PLC-type delay demodulation circuit that has a small size and is capable of improving the flexibility of the design and reducing loss.

SUMMARY OF THE INVENTION

In order to achieve the object, according to an aspect of the invention, a PLC-type delay demodulation circuit includes a planar lightwave circuit that is formed on one PLC chip and demodulates a DQPSK-modulated optical signal. The planar lightwave circuit includes: an optical splitter that branches the DQPSK-modulated optical signal into two optical signals; and first and second Mach-Zehnder Interferometers (MZIs) that delay the branched optical signals by one bit so as to interfere with each other. The length of a short delay line of the first MZI is different from that of a short delay line of the second MZI, and the length of an optical path from the optical splitter to an output end of the first MZI through the short delay line of the first MZI is equal to that of an optical path from the optical splitter to an output end of the second MZI through the short delay line of the second MZI. Here, the 'MZI' stands for Mach-Zehnder Interferometer.

According to another aspect of the invention, in the PLC-type delay demodulation circuit, the planar lightwave circuit may further include two input waveguides that are branched from the optical splitter and are connected to input couplers of the first and second MZIs, first and second light output waveguides that extend from an output coupler of the first MZI to the output ends thereof, and third and fourth light output waveguides that extend from an output coupler of the second MZI to the output ends thereof. An optical path length L1 of the short delay line of the first MZI may be greater than an optical path length L2 of the short delay line of the second MZI, and the sum of the optical path lengths of one of the two input waveguides and the third and fourth light output waveguides may be L1-L2 greater than the sum of the optical path lengths of the other one of the two input waveguides and the first and second light output waveguides.

According to another aspect of the invention, in the PLC-type delay demodulation circuit, the length of the one input waveguide may be L1-L2 greater than that of the other input waveguide, and the optical path lengths of the first and second light output waveguides and the optical path lengths of the third and fourth light output waveguides may be equal to each other.

According to another aspect of the invention, in the PLC-type delay demodulation circuit, each of the two input waveguides may be a U-shaped waveguide including a curved waveguide.

According to this structure, it is possible to easily adjust the lengths of the waveguides in a narrow region.

According to another aspect of the invention, in the PLC-type delay demodulation circuit, the one input waveguide may be arranged outside the other input waveguide.

According to another aspect of the invention, in the PLC-type delay demodulation circuit, the two input waveguides may have the same optical path length, and the optical path length of each of the third and fourth light output waveguides may be L1-L2 greater than that of each of the first and second light output waveguides.

According to another aspect of the invention, in the PLC-type delay demodulation circuit, two delay lines of the first MZI and two delay lines of the second MZI may be formed in the same region of the planar lightwave circuit such that the short delay line of the first MZI and a long delay line of the second MZI intersect each other at four points.

According to another aspect of the invention, in the PLC-type delay demodulation circuit, a first half-wave plate having a main axis that is inclined at an angle of 45 degrees with respect to a refractive index main axis of the delay lines may be inserted in central portions of the two delay lines of the first MZI and central portions of the two delay lines of the second MZI.

According to this structure, it is possible to reduce a polarization dependent frequency PDf.

According to another aspect of the invention, in the PLC-type delay demodulation circuit, a second half-wave plate having a main axis that is parallel or horizontal to the refractive index main axis of the delay lines may be inserted at a position that deviates from the central portions of the two delay lines of the first MZI to an output side and a position that deviates from the central portions of the two delay lines of the second MZI to the output side.

According to this structure, it is possible to prevent the deterioration of the polarization dependent frequency PDf due to polarization in the coupler.

According to another aspect of the invention, in the PLC-type delay demodulation circuit, the central portions of the two delay lines of the first MZI may extend in parallel so as to be close to each other, and the central portions of the two delay lines of the second MZI may extend in parallel so as to be close to each other.

According to this structure, it is possible to reduce the retardation (phase difference) of the half-wave plate.

According to another aspect of the invention, in the PLC-type delay demodulation circuit, each of the input couplers and the output couplers of the first and second MZIs may be a 3-dB coupler having two inputs and two outputs, and each of the two input waveguides may be connected to one of two input ends of the input couplers on the same side.

According to this structure, it is possible to use balanced receivers, which are pairs of the same light receiving elements, at two output ends of the first MZI and two output ends of the second MZI.

According to the invention, the first MZI and the second MZI are formed so as to overlap each other in the same region. Therefore, it is possible to reduce the size of a delay demodulation device. For example, it is possible to design the delay demodulation device such that only the short delay line of the first MZI and only the long delay line of the second MZI intersect each other. Therefore, it is possible to improve the flexibility of the design and reduce loss.

In addition, the distances from the optical splitter to the input couplers of the MZIs or the distances from the output couplers of the MZIs to the output ends do not need to be equal to each other. Therefore, it is possible to improve the flexibility of the design for the setting of the positions of the input and output ends.

DETAILED DESCRIPTION OF THE EXEMPLARY EMBODIMENTS

PLC-type delay demodulation circuits according to exemplary embodiments of the invention will be described with reference to the accompanying drawings.

Figure 12:
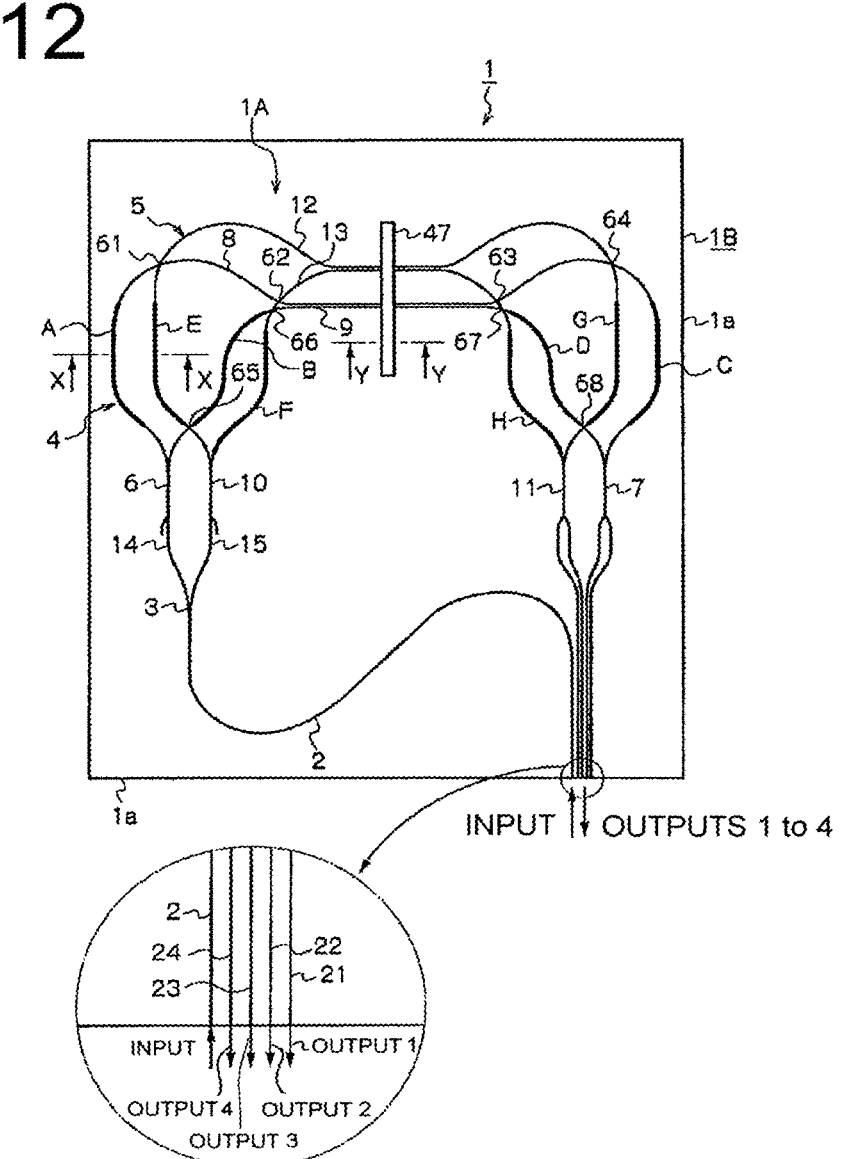
FIG. 12 is a plan view schematically illustrating the structure of the related art.

In the following exemplary embodiments, the same components as those in the PLC-type delay demodulation circuit shown in FIG. 12 are denoted by the same reference numerals.

(First Exemplary Embodiment)

A PLC-type delay demodulation circuit according to a first exemplary embodiment will be described with reference to FIGS. 1 to 7.

Figure 1:
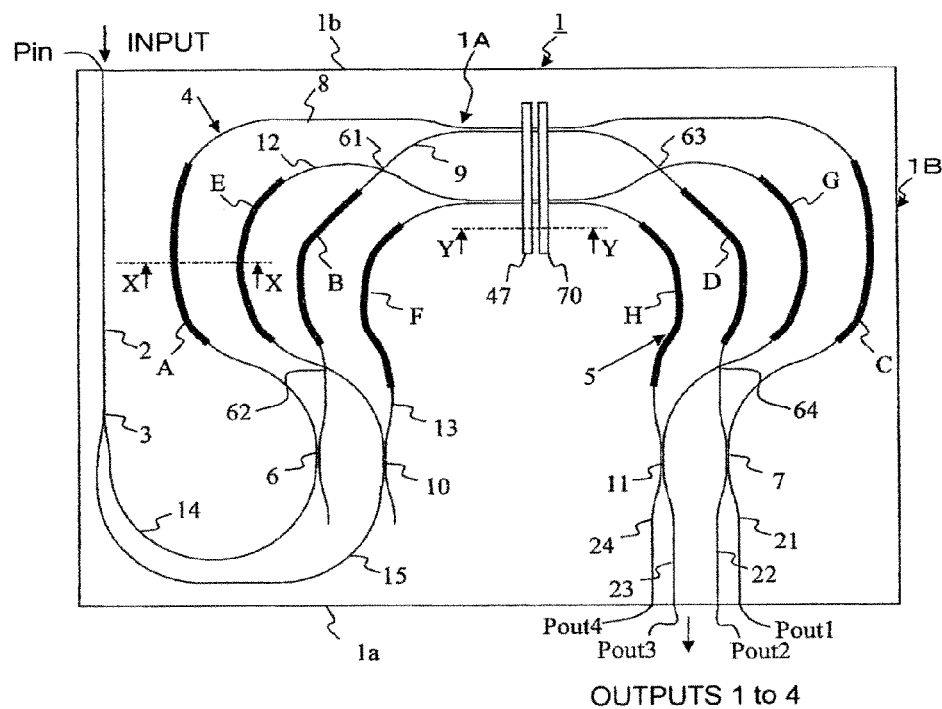
FIG. 1 is a plan view schematically illustrating the structure of a PLC-type delay demodulation circuit according to a first exemplary embodiment.

A PLC-type delay demodulation circuit 1 shown in FIG. 1 is a planar-lightwave-circuit-type (PLC-type) delay demodulation device in which a planar lightwave circuit 1A that is made of, for example, quartz-based glass and demodulates a DQPSK-modulated optical signal (DQPSK signal) is formed on one PLC chip 1B. The PLC-type delay demodulation circuit (hereinafter, referred to as a delay demodulation device) 1 is, for example, a 40 Gbps DQPSK delay demodulation device used in a 40 Gbps DQPSK optical transmission system shown in FIG. 2.

In the specification, the "delay demodulation device 1 (PLC-type delay demodulation circuit)" used in the DQPSK optical transmission system refers to a device in which a DQPSK signal is branched into two DQPSK signals, two MZIs delay the branched DQPSK signals by one bit such that the DQPSK signals interfere with each other, thereby converting the signals into intensity-modulated optical signals (light intensity signals), and the converted four light intensity signals (I channel signals and Q channel signals) are output to four light receiving elements of two sets of balanced receivers 51 and 52. That is, in the specification, the "delay demodulation device 1" refers to an optical demodulator that does not include a balanced receiver, includes one PLC chip used in the DQPSK optical transmission system, and demodulates the DQPSK signal.

Figure 2:
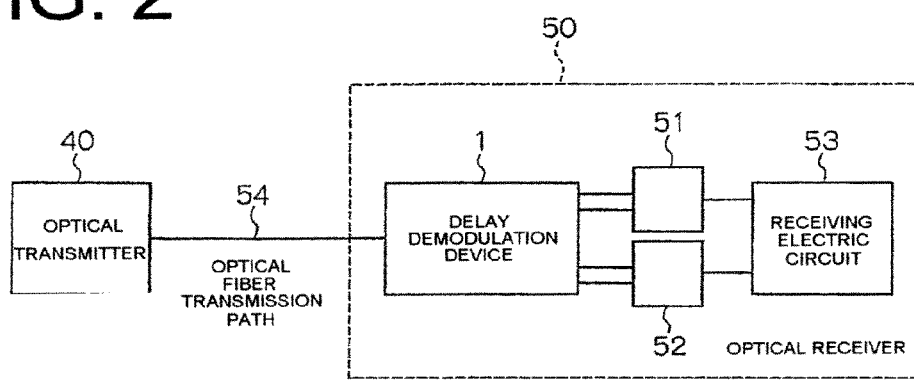
FIG. 2 is a block diagram schematically illustrating the structure of a DQPSK optical transmission system.

In the optical transmission system shown in FIG. 2, DQPSK signals are transmitted from an optical transmitter 40 to an optical fiber transmission path 54. In the DQPSK signals, four information items of the values (0, 1, 2 and 3) of symbols, each of which is 2-bit data, are modulated into phase information of the phases ($\theta$, $\theta+\pi/2$, $\theta+\pi$, and $\theta+3\pi/2$) of carrier waves according to a variation in the values of two adjacent symbols. That is, the DQPSK signal has a meaning corresponding to 2 bits such that the phase of light in one symbol (time slot) is any one of four values ($1/4\pi$, $3\pi/4$, $5\pi/4$, and 7π/4). Therefore, an optical receiver 50 can demodulate transmission data by detecting a phase difference (any one of the phase differences 0, π/2, π, and 3π/2) between two adjacent symbols.

The DQPSK signals transmitted from the optical fiber transmission line 54 to the optical receiver 50 are converted into four light intensity signals by the delay demodulation device 1, and the light intensity signals are converted into electric signals by the balanced receivers 51 and 52. For example, a receiving electric circuit 53 performs a decoding process.

The delay demodulation device 1 shown in FIG. 1 includes a light input waveguide 2 that receives DQPSK signals, a Y-branch waveguide 3 serving as an optical splitter that branches the light input waveguide 2, and first and second Mach-Zehnder interferometers 4 and 5 that delay each of the DQPSK signals branched by the Y-branch waveguide 3 by one bit. In the following description, the Mach-Zehnder interferometer is referred to as an MZI.

The first MZI 4 includes an input coupler 6 that is connected to one (waveguide 14) of two waveguides (input waveguides) 14 and 15 branched from the Y-branch waveguide 3, an output coupler 7 having two output ends connected to two light output waveguides 21 and 22, and two arm waveguides (delay lines) 8 and 9 that have different lengths and are connected between the two couplers 6 and 7. Similarly, the second MZI 5 includes an input coupler 10 that is connected to the other one (waveguide 15) of the two waveguides 14 and 15 branched from the Y-branch waveguide 3, an output coupler 11 having two output ends connected to two light output waveguides 23 and 24, and two arm waveguides (delay lines) 12 and 13 that have different lengths and are connected between the two couplers 10 and 11.

Each of the input couplers 6 and 10 and the output couplers 7 and 11 is a 3-dB coupler (50% directional coupler) with two inputs and two outputs. One of the two input ends of the input coupler 6 of the first MZI 4 is connected to one (waveguide 14) of the two waveguides 14 and 15 branched from the Y-branch waveguide 3. One of the two input ends of the input coupler 10 of the second MZI 5 is connected to the other one (waveguide 15) of the two waveguides 14 and 15 branched from the Y-branch waveguide 3.

In this exemplary embodiment, the waveguide 14 is connected to the left input end of the input coupler 6 and the waveguide 15 is connected to the left input end of the input coupler 10. However, the waveguide 14 may be connected to the right input end of the input coupler 6, and the waveguide 15 may be connected to the right input end of the input coupler 10. As such, it is preferable that each of the waveguide 14 and the waveguide 15 be connected to one of the two input ends of each of the input couplers 6 and 10 on the same side. This is because the same balanced receivers 51 and 52, which are pairs of the same light receiving elements, can be used for two output ends (output ports Pout1 and Pout2) of the first MZI 4 and two output ends (output ports Pout3 and Pout4) of the second MZI 5.

Two output ends (a through port and a cross port) of the output coupler 7 of the first MZI 4 are connected to the first light output waveguide 21 and the second light output waveguide 22, respectively. Similarly, two output ends (a through port and a cross port) of the output coupler 11 of the second MZI 5 are connected to the third light output waveguide 23 and the fourth light output waveguide 24, respectively.

There is an optical path length difference ΔL between the two arm waveguides 8 and 9 of the first MZI 4 such that the phase of the DQPSK signal propagated through one (long arm waveguide 8) of the arm waveguides 8 and 9 is delayed from the phase of the DQPSK signal propagated through the other arm waveguide (short arm waveguide 9) by a value (for example, when the symbol rate is 40 Gbit/s, the symbol rate of each of an I channel and a Q channel may be 20 Gbit/s (which is half of 40 Gbit/s) and thus the amount of delay is 50 ps (picoseconds)) corresponding to one bit of the symbol rate (1-bit time slot: 1 time slot). Therefore, in the first MZI 4, light components of adjacent time slots interfere with each other. Similarly, there is an optical path length difference ΔL between the two arm waveguides 12 and 13 of the second MZI 5 such that the phase of the DQPSK signal propagated through one (long arm waveguide 12) of the arm waveguides 12 and 13 is delayed from the phase of the DQPSK signal propagated through the other arm waveguide (short arm waveguide 13) by a value (for example, a delay of 50 ps (picoseconds) when the symbol rate is 40 Gbit/s) corresponding to one bit of the symbol rate. Therefore, in the second MZI 5, light components of adjacent time slots interfere with each other.

In addition, the two MZIs 4 and 5 have interference characteristics of a phase difference of 90°. Therefore, the optical path length difference between the two arm waveguides 8 and 9 of the first MZI 4 is the sum of the amount of delay corresponding to 1 bit and a length corresponding to a phase of 1/4π of the optical signal. The optical path length difference between the two arm waveguides 12 and 13 of the second MZI 5 is the difference between the amount of delay corresponding to 1 bit and a length corresponding to a phase of 1/4π of the optical signal.

In this way, there is a phase difference of 90° between the phases of the interfering light components of adjacent time slots in the first MZI 4 and the phases of the interfering light components of adjacent time slots in the second MZI 5.

The first characteristic of the invention is that the optical path length L1 of the short arm waveguide 9 of the first MZI 4 is different from the optical path length L2 of the short arm waveguide 13 of the second MZI 5 and the length of an optical path from the Y-branch waveguide 3 to the output ends (the output ports of the light output waveguides 21 and 22) of the first MZI 4 through the short arm waveguide 9 of the first MZI 4 is substantially equal to the length of an optical path from the Y-branch waveguide 3 to the output ends (the output ports of the light output waveguides 23 and 24) of the second MZI 5 through the short arm waveguide 13 of the second MZI 5.

The lengths of four optical paths of the optical signals from the Y-branch waveguide 3 to four output ends (Pout1 to Pout4) are as follows.

The length of an optical path from the Y-branch waveguide 3 to the output port (output end) Pout1 through the waveguide 14, the input coupler 6 of the first MZI 4, the short arm waveguide 9, the output coupler 7, and the first light output waveguide 21 is L21.

The length of an optical path from the Y-branch waveguide 3 to the output port (output end) Pout2 through the waveguide 14, the input coupler 6 of the first MZI 4, the short arm waveguide 9, the output coupler 7, and the second light output waveguide 22 is L22.

The length of an optical path from the Y-branch waveguide 3 to the output port (output end) Pout3 through the waveguide 15, the input coupler 10 of the second MZI 5, the short arm waveguide 13, the output coupler 11, and the third light output waveguide 23 is L23.

The length of an optical path from the Y-branch waveguide 3 to the output port (output end) Pout4 through the waveguide 15, the input coupler 10 of the second MZI 5, the short arm waveguide 13, the output coupler 11, and the fourth light output waveguide 24 is L24.

That is, the first characteristic is that the optical path length L1 of the short arm waveguide 9 of the first MZI 4 is different from the optical path length L2 of the short arm waveguide 13 of the second MZI 5 and the four optical path lengths L21 to L24 are equal to each other.

In this exemplary embodiment, in order to achieve the first characteristic, the optical path length L1 of the arm waveguide 9 is greater than the optical path length L2 of the arm waveguide 13, the optical path lengths of the first to fourth light output waveguides 21 to 24 are equal to each other, and the length of the waveguide 15 is greater than that of the waveguide 14 by a value L1-L2.

In this case, each of the waveguide 15 and the waveguide 14 is a U-shaped waveguide including a curved waveguide, and the waveguide 15 is arranged along the waveguide 14 outside the waveguide 14. In this way, it is possible to easily adjust the lengths of the waveguides in a narrow region.

Next, the U-shaped waveguides 14 and 15 will be described in detail.

An input end (input port Pin) of the light input waveguide 2 is provided at an end surface 1b, which is one (upper long side) of the long sides of the PLC chip 1B having a rectangular shape in a plan view. The light input waveguide 2 extends in a straight line from the input port Pin along an end surface 1c, which is one (left short side) of the short sides of the PLC chip 1B, and is then connected to the input end of the Y-branch waveguide 3. The waveguide 14 connected to one output end of the Y-branch waveguide 3 is a U-shaped waveguide that is curved at an angle of about 180° and connects the Y-branch waveguide 3 and the input coupler 6.

The waveguide 15 connected to the other output end of the Y-branch waveguide 3 is a U-shaped waveguide which is arranged outside the waveguide 14, that is, which is arranged so as to be curved close to an end surface 1a opposite to the end surface 1b. The U-shaped waveguide includes a waveguide that is curved at an angle of about 90°, a straight waveguide, and a waveguide that is curved at an angle of about 90°, and connects the Y-branch waveguide 3 and the input coupler 10.

As such, when each of the waveguide 15 and the waveguide 14 has a U shape, it is possible to easily adjust the lengths of the waveguides in a narrow region.

In this exemplary embodiment shown in FIG. 1, the waveguide 15 is arranged outside the waveguide 14, but the invention is not limited thereto. For example, the waveguides 14 and 15 may be formed as follows, depending on the difference between the lengths thereof. The waveguide 14 may be arranged outside the waveguide 15 between the Y-branch waveguide 3 and an intersection point therebetween, the waveguide 14 and the waveguide 15 may intersect each other at the intersection point, and then the waveguides 14 and 15 may be connected to the input couplers 6 and 10 shown in FIG. 1, respectively.

Another characteristic of the delay demodulation device 1 according to this exemplary embodiment is that the two arm waveguides 8 and 9 of the first MZI 4 and the two arm waveguides 12 and 13 of the second MZI 5 are formed so as to overlap each other in the region surrounded by the first MZI 4 arranged on the outermost side in the planar lightwave circuit (PLC) 1A.

In this exemplary embodiment, as an example of the overlap, the arm waveguide 9 and the arm waveguide 12 are formed in the same region of the planar lightwave circuit (PLC) 1A such that the arm waveguide 9 and the arm waveguide 12 intersect each other at four points.

That is, as shown in FIG. 1, the arm waveguide 9 of the first MZI 4 and the arm waveguide 12 of the second MZI 5 intersect each other at intersection points 61 to 64.

The two arm waveguides intersect each other at the intersection points 61 to 64, and light components (DQPSK signals) propagated through the two arm waveguides pass through the intersection portions and are then propagated through the same arm waveguides. For example, the two arm waveguides 9 and 12 intersect each other at the intersection point 61 and the DQPSK signals propagated through the two arm waveguides 9 and 12 pass through the intersection portion and are then propagated through the same arm waveguides 9 and 12.

The planar lightwave circuit 1A shown in FIG. 1 is a circuit including, for example, the light input waveguide 2, the Y-branch waveguide 3, the first and second MZIs 4 and 5, and four light output waveguides 21 to 24, which are made of quartz-based glass. The delay demodulation device 1 including the planar lightwave circuit 1A is manufactured as follows.

Figure 3:
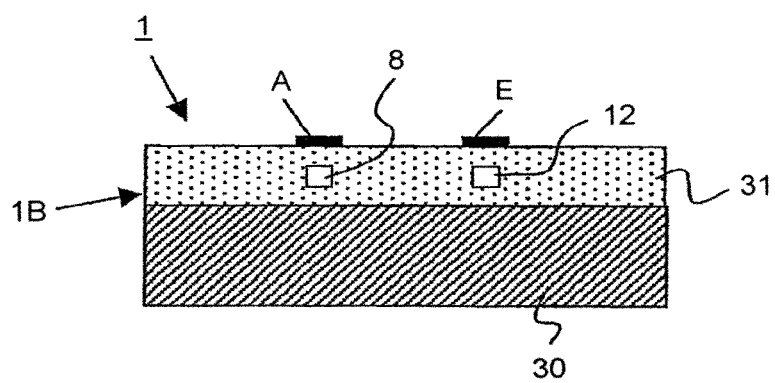
FIG. 3 is a cross-sectional view taken along the line X-X of FIG. 1.

A silica material ($SiO_2$-based glass particles) for forming a lower cladding layer and a core layer is deposited on a PLC substrate 30, such as a silicon substrate shown in FIG. 3, by a flame hydrolysis deposition (FHD) method. Then, heating is performed to fuse a glass film and make the glass film transparent. Then, desired waveguides are formed by photolithography and reactive ion etching, and an upper cladding layer is formed by the FHD method. In FIG. 3, a cladding layer 31 including the lower cladding layer and the upper cladding layer is formed on the PLC substrate 30, and the arm waveguides 8 and 12 are formed as a core layer in the cladding layer 31. The PLC substrate 30 has a rectangular shape in a plan view, as shown in FIG. 1. The planar shape of the PLC substrate 30 is not limited to the rectangle, but it may be a square shape or other shapes.

In the delay demodulation device 1 according to this exemplary embodiment, the first MZI 4 and the second MZI 5 are formed on the PLC substrate 30, which is a planar lightwave circuit board, so as to be substantially symmetric with respect to an insertion portion of a first half-wave plate 47.

In order to reduce a polarization dependent frequency PDf, the first half-wave plate 47 whose main axis is inclined at an angle of 45° with respect to the refractive index main axis of the arm waveguide is inserted in the central portions of the two arm waveguides 8 and 9 of the first MZI 4 and in the central portions of the two arm waveguides 12 and 13 of the second MZI 5 in the delay demodulation device 1.

In addition, in the delay demodulation device 1, a second half-wave plate 70 whose main axis is parallel or horizontal to the refractive index main axis of the arm waveguide is inserted at a position that is spaced 200 μm apart from the central portions of the two arm waveguides 8 and 9 of the first MZI 4 to the output side and a position that is spaced 200 μm apart from the central portions of the two arm waveguides 12 and 13 of the second MZI 5 to the output side, in order to prevent the deterioration of the polarization dependent frequency PDf due to polarization in the coupler.

Even when polarization occurs in the coupler, as described in WO 2008/084707, the use of the first and second half-wave plates 47 and 70 enables the interference conditions of polarized light to be the same as the interference conditions of general non-polarized light. Therefore, the polarization dependence of an interference circuit does not occur.

Figure 4:
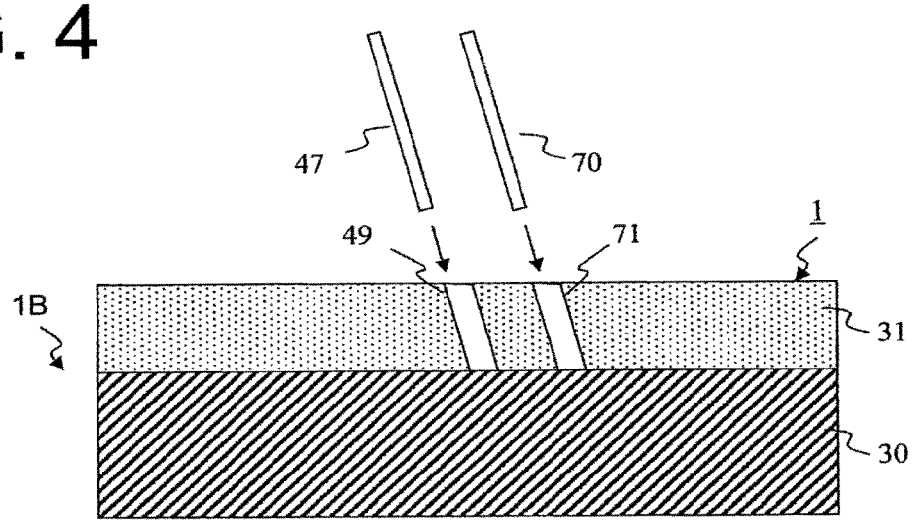
FIG. 4 is a cross-sectional view taken along the line Y-Y of FIG. 1.

As shown in FIG. 4, a groove 49 for inserting the first half-wave plate 47 and a groove 71 for inserting the second half-wave plate 70 are formed in the cladding layer 31. The groove 49 and the groove 71 are inclined at an angle of about 8° in order to prevent loss due to the reflection of light from the half-wave plates 47 and 70. As shown in FIG. 4, the half-wave plates 47 and 70 are respectively arranged in the grooves 49 and 71 while being inclined at an angle of about 8°. The grooves 49 and 71 are vertical to the waveguides in the plane of the substrate and are inclined at an angle of about 8° in the vertical direction (the thickness direction of the substrate) so as to pass through the centers of the two MZIs.

In the delay demodulation device 1, as shown in FIG. 1, the central portions of the two arm waveguides 8 and 9 of the first MZI 4 extend in parallel so as to be close to each other, and the central portions of the two arm waveguides 12 and 13 of the second MZI 5 extend in parallel so as to be close to each other.

At the centers of the arm waveguides 8 and 9 and the centers of the arm waveguides 12 and 13, portions into which the half-wave plates 47 and 70 are inserted have a large width in order to prevent diffraction loss.

In FIG. 1, the half-wave plate 70 is arranged close to the half-wave plate 47, but the position of the half-wave plate 70 is not limited thereto. It is preferable that the half-wave plate 70 be arranged close to the half-wave plate 47 in a portion with a large width in each of the arm waveguides 8, 9, 12, and 13 where the half-wave plate 47 is arranged.

Another characteristic of the delay demodulation device 1 is as follows.

As shown in FIG. 1, the output ends (the output ports Pout1 and Pout2) of two light output waveguides 21 and 22 and the output ends (the output ports Pout3 and Pout4) of two light output waveguides 23 and 24 are formed at the same end surface 1a of the PLC chip 1B. That is, the output ports Pout1 to Pout4, which are the output ends of four light output waveguides 21 to 24, are provided at the same end surface 1a, which is one of the four sides of the PLC chip 1B, so as to be close to each other.

The input end (input port Pin) of the light input waveguide 2 is provided at the end surface 1b opposite to the end surface 1a of the PLC chip 1B.

In the delay demodulation device 1, heaters are formed on the two arm waveguides 8 and 9 of the first MZI 4 and the two arm waveguides 12 and 13 of the second MZI 5.

In this exemplary embodiment, for example, heaters A and C are formed on the arm waveguide 8 on both sides of the center thereof, and heaters B and D are formed on the arm waveguide 9 on both sides of the center thereof. In addition, heaters E and G are formed on the arm waveguide 12 on both sides of the center thereof, and heaters F and H are formed on the arm waveguide 13 on both sides of the center thereof. Each of the heaters A to H is a Ta-based thin film heater that is formed on the upper cladding (the cladding layer 31 shown in FIG. 3) by sputtering, above the corresponding arm waveguide. FIG. 3 shows the heaters A and E that are formed on the cladding layer 31 above the arm waveguides 8 and 12, respectively.

In the delay demodulation device 1, the output ends of the light output waveguides 21 and 22 are the first and second output ports Pout1 and Pout2 that output optical signals (intensity-modulated optical signals), which are outputs 1 and 2 (see FIG. 5), having a phase difference of $\pi$ therebetween. The output ends of the light output waveguides 23 and 24 are the third and fourth output ports Pout3 and Pout4 that output optical signals, which are outputs 3 and 4 (see FIG. 5), having a phase difference of $\pi$ therebetween.

In the delay demodulation device 1 having the above-mentioned structure, in the first MZI 4, the DQPSK signal (optical signal) transmitted from the optical fiber transmission path 54 to the optical receiver 50 is branched by the Y-branch waveguide 3 and the branched DQPSK signals are propagated through the two arm waveguides 8 and 9 with different lengths. The MZI 4 delays the phase of the DQPSK signal propagated through the arm waveguide 8 from the phase of the optical signal propagated through the arm waveguide 9 by $+1/4\pi$ corresponding to one bit of the symbol rate. Similarly, the second MZI 5 delays the phase of the DQPSK signal propagated through the arm waveguide 12 from the phase of the optical signal propagated through the arm waveguide 13 by $-1/4\pi$ corresponding to one bit of the symbol rate.

The delay demodulation device 1 drives the heaters A to D of the MZI 4 and the heaters E to H of the MZI 5 to adjust the polarization dependent frequency PDf or perform phase adjustment (phase trimming) such that the phase difference between the two MZIs 4 and 5 is $\pi/2$.

EXAMPLES

The planar lightwave circuit (PLC) 1A including the input waveguide 2, the Y-branch waveguide 3, the MZIs 4 and 5, and the light output waveguides 21 to 24, which were made of quartz-based glass, was formed on the silicon substrate 30 shown in FIG. 3 by a flame hydrolysis deposition (FHD) method, photolithography, and reactive ion etching, thereby manufacturing the 40 Gbps DQPSK delay demodulation device 1. In addition, the grooves 49 and 71 (see FIG. 4) were formed by dicing and the half-wave plates 47 and 70 were inserted into the grooves 49 and 71.

In the manufactured delay demodulation device 1, the difference (specific refractive index difference $\Delta$) between the refractive index of the cladding layer and the refractive index of the core layer was 1.5%, and the circuit (the PLC chip 1B) had a small size of 13 mm by 16.5 mm. FSR was 23 GHz. Some of the heaters on the two MZIs 4 and 5 were driven to adjust the polarization dependent frequency PDf. After the adjustment, some of the heaters on the two MZIs 4 and 5 were driven to perform phase adjustment (phase trimming) such that the phase difference between the two MZIs 4 and 5 was $\pi/2$. That is, interference characteristics in which a phase difference of 90° occurred between the two MZIs 4 and 5 were obtained by the phase adjustment.

At that time, the half-wave plates 47 and 70 were selected and used such that good PDf characteristics were obtained from both the MZI 4 and the MZI 5.

Then, a fiber block including one optical fiber was connected to the end surface 1b of the PLC chip 1B in which the end of the light input waveguide 2 to which the optical signal was input was provided. A fiber array including four optical fibers arranged therein was connected to the end surface 1a of the PLC chip 1B, which was the ends (output ports Pout1 to Pout4) of the light output waveguides 21, 22, 23, and 24 respectively outputting optical signals (intensity-modulated optical signals), which were outputs 1 to 4, and packaging was performed. In addition, a Peltier element and a thermostat were used as a temperature control mechanism. In this way, a module including the delay demodulation device 1 was manufactured.

Figure 5:
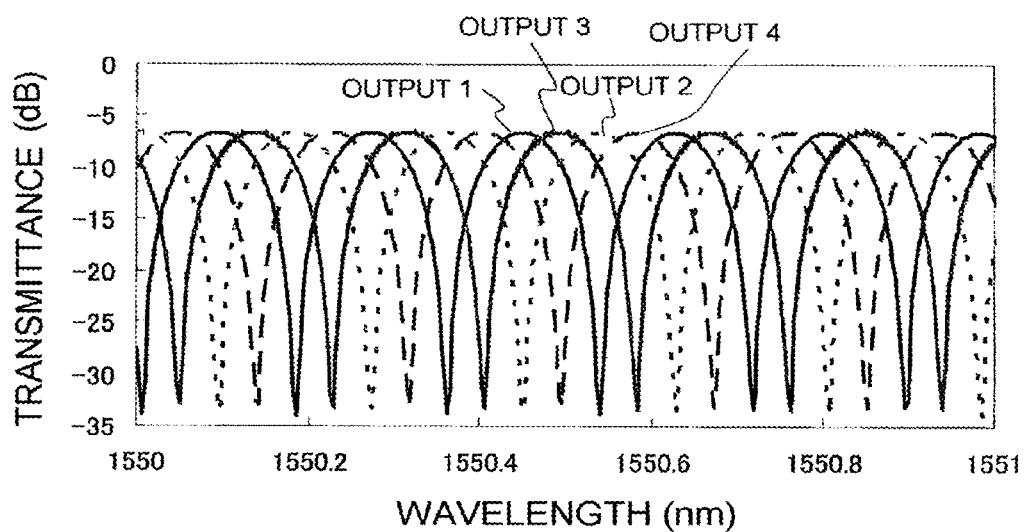
FIG. 5 is a graph illustrating the spectrum of the PLC-type delay demodulation circuit.
Figure 6:
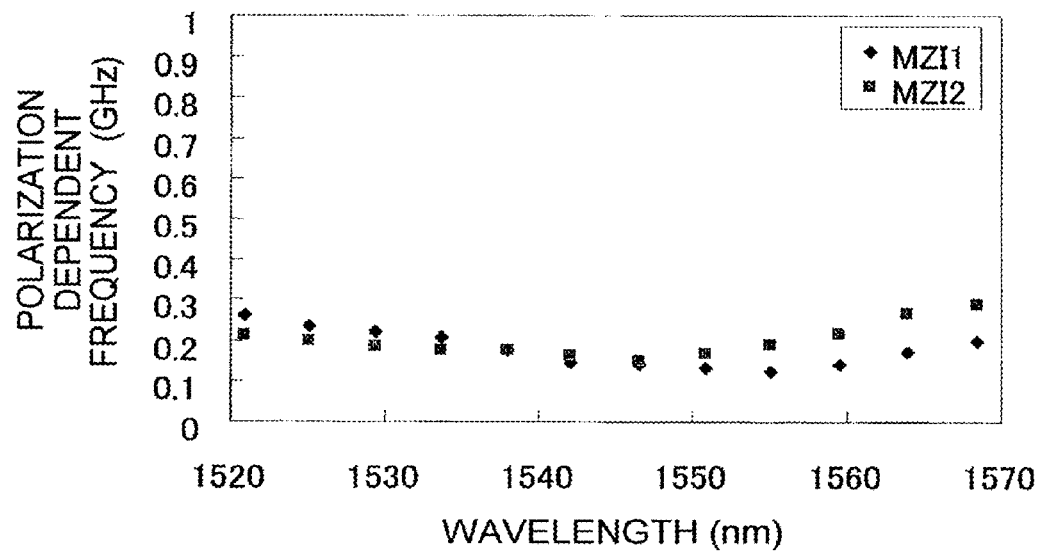
FIG. 6 is a graph illustrating the wavelength dependence of PDf of the PLC-type delay demodulation circuit.

The insertion loss spectrum and the polarization dependent frequency PDf of the manufactured 40 Gbps DQPSK delay demodulation device (DQPSK PLC-type delay demodulation circuit) 1 were evaluated in the C-band (1520 nm to 1570 nm) generally used in multi-wavelength optical communication. FIG. 5 shows the spectrum in the vicinity of a wavelength of 1550 nm, and FIG. 6 shows PDf in the entire C-band. First, as can be seen from FIG. 5, a good interference spectrum is obtained. The insertion loss was equal to or less than 6.5 dB in the entire C-band. As can be seen from FIG. 6, when PDf is equal to or less than 0.2 GHz, good characteristics are obtained in the entire C-band.

Figure 7:
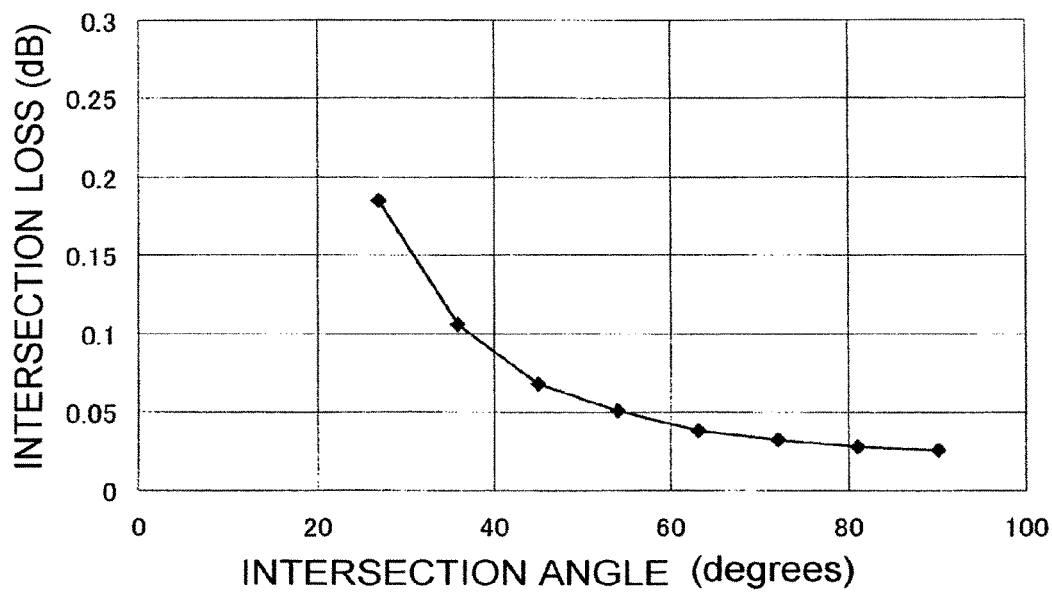
FIG. 7 is a graph illustrating the relationship between an intersection angle and intersection loss in the PLC-type delay demodulation circuit.

In order to estimate intersection loss, the same waveguides as those in the delay demodulation device 1 were used to manufacture intersection waveguides for test having various intersection angles, insertion loss was measured, and the relationship between the intersection angle and loss per intersection point was calculated. The result is shown in FIG. 7.

Table 1 shows the above-mentioned result and the calculation result of intersection loss between the arm waveguides based on the intersection angles of the arm waveguides at the intersection points 61 to 64.

For comparison, Table 2 shows the calculation result of intersection loss in the delay demodulation device shown in FIG. 12.

TABLE 1

Intersection angle and intersection loss in first exemplary embodiment

| Intersection point/arm | Intersection point | | | | Arm | | | |
|---|---|---|---|---|---|---|---|---|
| Number | 61, 63 | 62, 64 | — | — | 8 | 9 | 12 | 13 |
| Intersection angle (degree) | 66 | 58 | — | — | — | — | — | — |
| Intersection loss (dB) | 0.035 | 0.04 | — | — | 0.0 | 0.15 | 0.15 | 0.0 |

TABLE 2

Intersection angle and intersection loss in delay demodulation device shown in FIG. 12

| Intersection point/arm | Intersection point | | | | Arm | | | |
|---|---|---|---|---|---|---|---|---|
| Number | 61, 64 | 62, 63 | 65, 68 | 66, 67 | 8 | 9 | 12 | 13 |
| Intersection angle (degree) | 47 | 77 | 88 | 47 | — | — | — | — |
| Intersection loss (dB) | 0.07 | 0.03 | 0.03 | 0.07 | 0.2 | 0.2 | 0.2 | 0.2 |

As described above, two arm waveguides intersect each other at the intersection points 61 to 64, and light components (DQPSK signals) propagated through the two arm waveguides pass through the intersection portions and are then propagated through the same arm waveguides. As can be seen from a graph shown in FIG. 7, when the intersection angle at each of the intersection points 61 to 64 is equal to or more than about 35°, intersection loss is equal to or less than 0.1 dB, and it is considered that the light components are propagated through the same waveguides before and after intersection.

As can be seen from Tables 1 and 2, in the delay demodulation device according to this exemplary embodiment, it is possible to reduce intersection at a small intersection angle, which results in a reduction in intersection loss in each arm waveguide.

The first exemplary embodiment having the above-mentioned structure has the following operation and effects. According to the first characteristic, that is, the structure in which the optical path length L1 of the short arm waveguide 9 of the first MZI 4 is different from the optical path length L2 of the short arm waveguide 13 of the second MZI 5 and the four optical path lengths L21 to L24 are equal to each other, it is possible to improve the flexibility of the design and arrange the arm waveguides at a small intersection angle, thereby reducing the size of a delay demodulation device, as compared to the structure in which the arm waveguide 9 and the arm waveguide 13 have the same optical path length.

Even when the input end (input port Pin) and the output ends (output ports Pout1 to Pout4) are provided at different end surfaces, it is possible to reduce the size of the planar lightwave circuit 1A by forming the waveguide 15 and the waveguide 14 in a U shape and adjusting the length of the U-shaped portion, as shown in FIG. 1.

In the delay demodulation device 1, the two arm waveguides 8 and 9 of the first MZI 4 and the two arm waveguides 12 and 13 of the second MZI 5 are formed so as to overlap each other in the same region of the planar lightwave circuit 1A. Specifically, the arm waveguide 9 and the arm waveguide 12 are formed in the same region of the planar lightwave circuit 1A such that the arm waveguide 9 and the arm waveguide 12 intersect each other at four points. According to this structure, it is possible to reduce the overall size of the planar lightwave circuit 1A. In particular, the area of a portion including the two arm waveguides 8 and 9 of the first MZI 4 and the two arm waveguides 12 and 13 of the second MZI 5 is reduced. Therefore, it is possible to reduce the size of the PLC chip 1B.

Since the size of the PLC chip 1B is reduced, a uniform temperature distribution is obtained in the plane of the planar lightwave circuit 1A and it is possible to significantly reduce the shift of a center wavelength due to a variation in the environment temperature. Since the size of the PLC chip 1B is reduced, a stress distribution in the plane of the PLC chip 1B which causes birefringence is reduced, and it is possible to significantly reduce the shift of the center wavelength due to a variation in the environment temperature. In this way, it is possible to obtain a delay demodulation device with little wavelength shift due to a variation in the environment temperature and a small initial polarization dependent frequency PDf.

When the size of the PLC chip 1B is reduced, it is also expected that the size or power consumption of a delay demodulation module using the delay demodulation device 1 will be reduced.

The first MZI 4 and the second MZI 5 are formed on the PLC substrate 30 so as to be substantially symmetric with respect to the center of the long side of a rectangle. Therefore, it is possible to further reduce the size and polarization dependent frequency PDf of the PLC chip 1B.

The half-wave plate 47 is inserted in the central portions of the two arm waveguides 8 and 9 of the first MZI 4 and the central portions of the two arm waveguides 12 and 13 of the second MZI 5. Therefore, it is possible to further reduce the polarization dependent frequency PDf.

The central portions of the two arm waveguides 8 and 9 of the first MZI 4 extend in parallel so as to be close to each other. In addition, the central portions of the two arm waveguides 12 and 13 of the second MZI 5 extend in parallel so as to be close to each other. According to this structure, it is possible to reduce the retardation (phase difference) of the half-wave plate 47.

The heaters A to H are formed on the two arm waveguides of each of the first and second MZIs 4 and 5. Therefore, it is possible to drive some of the heaters of the two MZIs 4 and 5 to adjust the polarization dependent frequency PDf. After the adjustment, it is possible to drive some of the heaters of the two MZIs 4 and 5 to perform phase adjustment (phase trimming) such that the phase difference between the two MZIs is π/2.

(Second Exemplary Embodiment)

Figure 8:
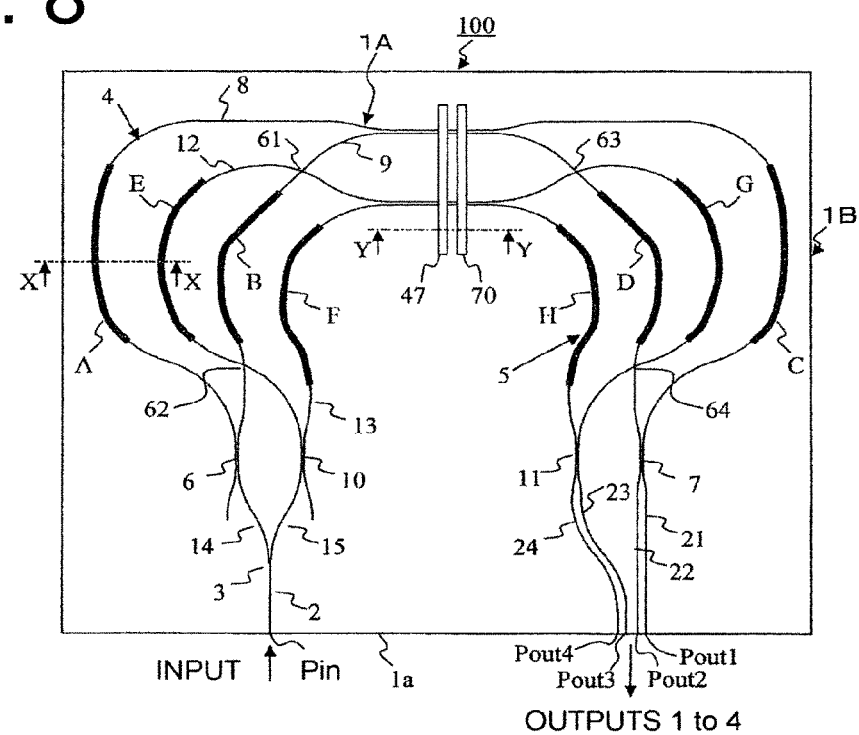
FIG. 8 is a plan view schematically illustrating the structure of a PLC-type delay demodulation circuit according to a second exemplary embodiment.

A planar-lightwave-circuit-type delay demodulation device 100 according to a second exemplary embodiment of the invention will be described with reference to FIG. 8.

In the delay demodulation device 100 according to the second exemplary embodiment, in order to achieve the first characteristic, the optical path length L1 of a short arm waveguide 9 of a first MZI 4 is greater than the optical path length L2 of a short arm waveguide 13 of a second MZI 5, a waveguide 14 and a waveguide 15 have the same optical path length, and the optical path length of each of third and fourth light output waveguides 23 and 24 is L1-L2 greater than the optical path length of each of first and second light output waveguides 21 and 22.

In the delay demodulation device 100, an input end (input port Pin) of a light input waveguide 2, output ends (output ports Pout1 and Pout2) of the light output waveguides 21 and 22, and output ends (output ports Pout3 and Pout4) of the light output waveguides 23 and 24 are formed at the same end surface 1a of a PLC chip 1B.

The other structures of the delay demodulation device 100 are the same as those of the delay demodulation device 1 according to the first exemplary embodiment. In this exemplary embodiment, a chip size (the size of the PLC chip 1B) is 17 mm×16 mm.

The delay demodulation device 100 according to the second exemplary embodiment has the following operation and effects, in addition to the operation and effects of the first exemplary embodiment.

Even when the input end (input port Pin) of the light input waveguide 2, the output ports Pout1 and Pout2 of the light output waveguides 21 and 22, and the output ports Pout3 and Pout4 of the light output waveguides 23 and 24 are formed in the same end surface 1a of the PLC chip 1B, the application of the first characteristic makes it possible to reduce the number of intersection points between the arm waveguides or improve flexibility in the arrangement of the end portions of the input and output waveguides.

(Third Exemplary Embodiment)

A planar-lightwave-circuit-type delay demodulation device according to the third exemplary embodiment of the invention will be described with reference to FIG. 1 and FIGS. 9-11.

The delay demodulation device according to the present embodiment has a characteristic that input couplers 6, 19 and output couplers 7, 11 of the delay demodulation device according to the first exemplary embodiment are replaced with a Wavelength Insensitive Coupler (WINC). It is noted that other components are same as ones of the first exemplary embodiment.

The WINC is comprised of directional couplers having coupling ratios of about 50% and 100% respectively, and a Mach-Zehnder Interferometer consisting of two arm waveguides binding directional couplers above and having an optical path length difference of about 0.35 um. Comparing to a directional coupler in general, a wavelength dependence of coupling ratio is reduced in the WINC above.

Figure 9:
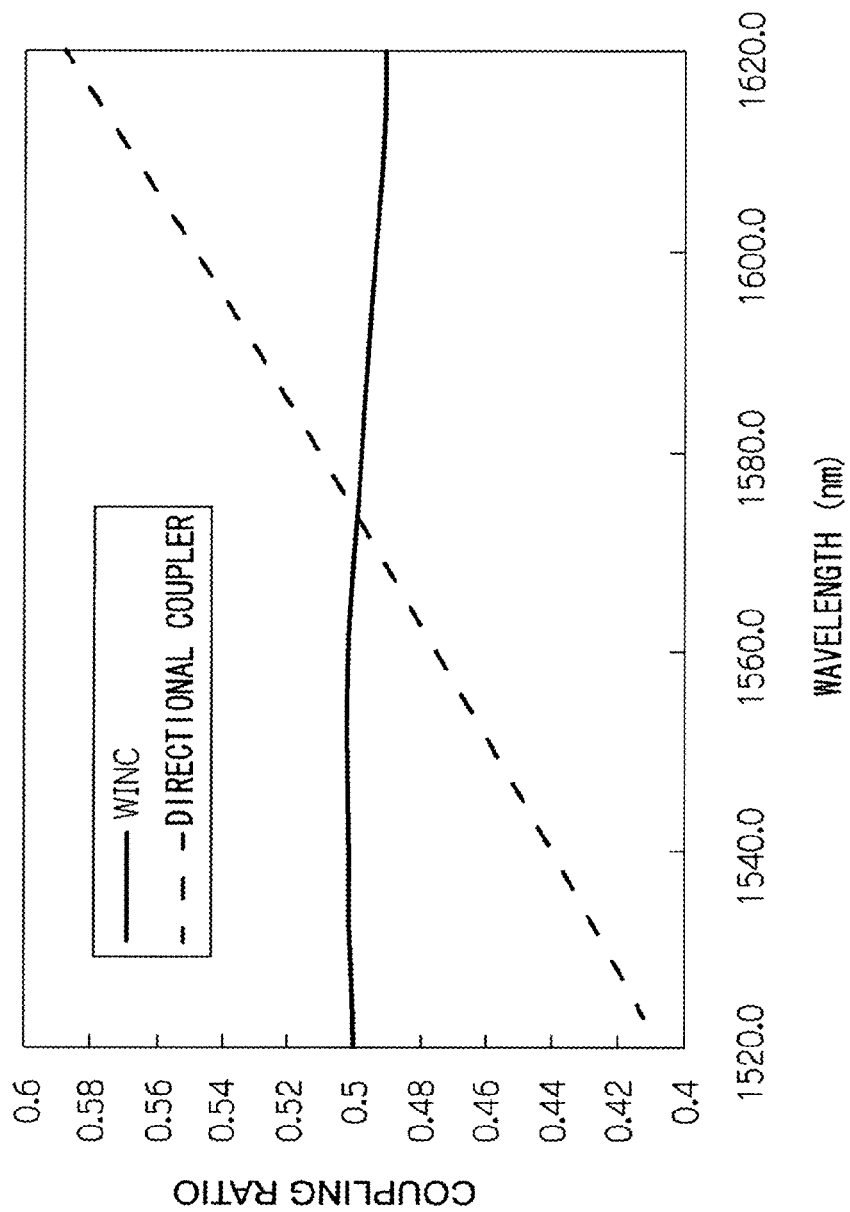
FIG. 9 is a diagram for characteristics showing wavelength-characteristic-calculated values (as a solid line) of coupling ratio of a WINC used as input and output couplers of a PLC-type delay demodulation circuit according to a third exemplary embodiment, and also showing wavelength-characteristic-calculated values (as a broken line) of coupling ratio of a general directional coupler as a comparison.

FIG. 9 shows wavelength-characteristic-calculated values of coupling ratio of the WINC above and the values are indicated as a solid line. As a comparison, wavelength-characteristic-calculated values of coupling ratio of a general directional coupler are indicated as a broken line. As can be seen from FIG. 9 above, in the WINC (the solid line), coupling ratio of about 50% is obtained in the entire C~L bands (about 1520 nm-about 1620 nm) and the wavelength-characteristic becomes flatten in large scale to compare with the general directional coupler (see the broken line).

Figure 10A:
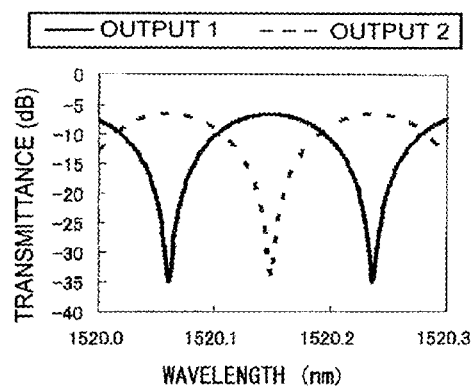
FIGS. 10A, 10B and 10C are diagrams for characteristics showing spectrum, in the vicinity of wavelength of 1520 nm, 1570 nm and 1620 nm respectively, of output ports 1 and 2 of a delay demodulation device with using the WINC according to the third exemplary embodiment.
Figure 10B:
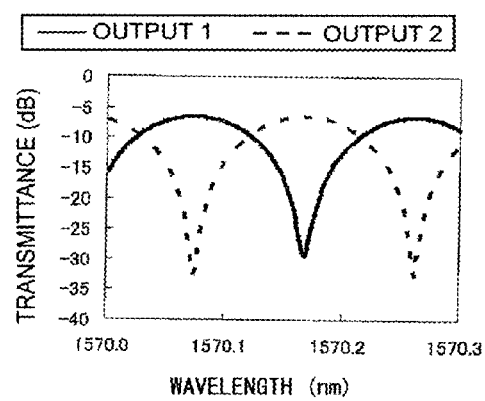
Figure 10C:
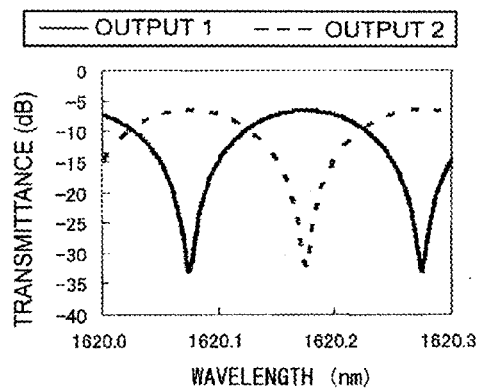
Figure 11A:
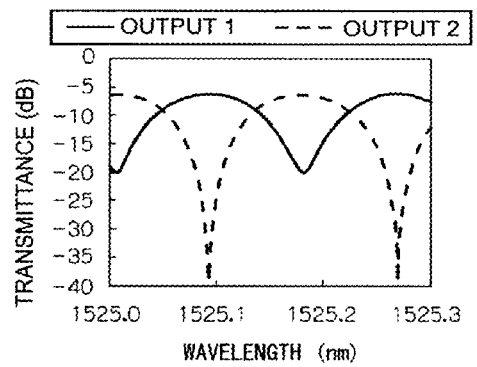
FIGS. 11A, 11B and 11C are diagrams for characteristics showing spectrum, in the vicinity of wavelength of 1520 nm, 1570 nm and 1620 nm respectively, of output ports 1 and 2 of a delay demodulation device with using a general directional coupler.
Figure 11B:
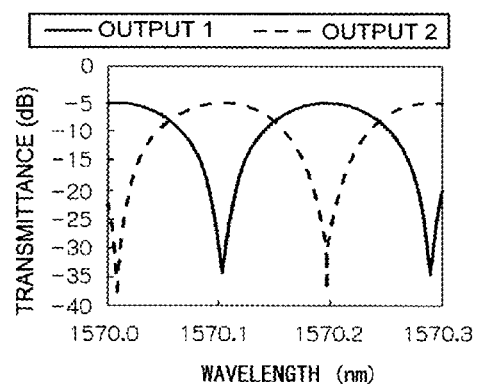
Figure 11C:
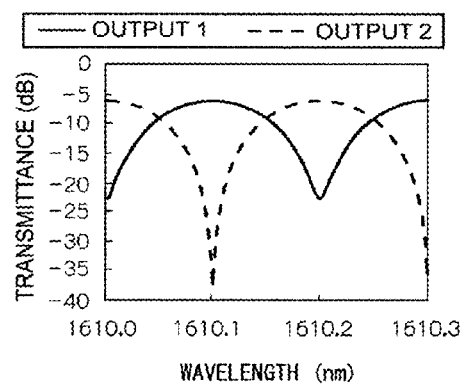

FIGS. 10A, 10B and 10C respectively show spectrum, in the vicinity of wavelength of 1520 nm, 1570 nm and 1620 nm, of output ports 1 and 2 (Pout 1 and Pout 2) of the delay demodulation device of the present exemplary embodiment with using the WINC above. As a comparison, FIGS. 11A, 11B and 11C respectively show spectrum, in the vicinity of wavelength of 1520 nm, 1570 nm and 1620 nm, of output ports 1 and 2 (Pout 1 and Pout 2) of a delay demodulation device with using a general directional coupler. As can be seen from FIGS. 11A, 11B and 11C, when the general directional coupler is used, the extinction ratio (the difference between the maximum value and the minimum value of transmittance) of the output 1 (through port of MZI 1) deteriorates massively as the wavelength becomes away from the value around 1570 nm in which the coupling ratio is about 50%. That is happened because generally the extinction ratio of the MZI circuit become maximum when the coupling ratio of the coupler is 50% and then the extinction ratio becomes deteriorated as the coupling ratio is away from the value of 50%. On the contrary, when the WINC shown in FIGS. 10A, 10B, 10C is used (in the case of the present exemplary embodiment), it is known that a high extinction ratio of 20 dB or more is obtained in across the wide band of 1520 nm-1620 nm at any wavelength band.

It is noted that FIGS. 10A, 10B, 10C and FIGS. 11A, 11B, 11C show only outputs 1 and 2 (Pout 1 and Pout 2), however, similar extinction ratios are obtained with regard to outputs 3 and 4 (Pout 3 and Pout 4). Furthermore, a good characteristic, such as 0.2 GHz or less in entire C, L bands, is gained with regard to the polarization dependent frequency PDf and there is no deterioration caused by using the WINC. Furthermore, the insertion loss is 6.7 dB or less in the entire C, L bands. The increase in loss, caused by using the WINC and expanding the evaluation wavelength band, is suppressed around 0.2 dB. As shown in the result above, it is confirmed that the wavelength band for use can be expanded by adapting the WINC as input couplers 6, 10 and output couplers 7, 11.

In each of the above-described exemplary embodiments, the arm waveguide 9 and the arm waveguide 12 intersect each other at four points, but the number of intersection points between the other arm waveguides is reduced. Therefore, the total number of intersection points between the arm waveguides and other arm waveguides is smaller than that in the related art. Loss occurs in the intersection portions at the intersection points 61 to 64, but the total loss in the intersection portions is about 0.1 dB, which does not cause a practical problem.

In each of the above-described exemplary embodiments, the arm waveguide 9 and the arm waveguide 12 intersect each other at four points. However, the invention can be applied to a delay demodulation device in which the arm waveguides 8 and 9 do not intersect the arm waveguides 12 and 13 or a delay demodulation device in which the number of intersection points between the arm waveguide 9 and the arm waveguide 12 is not four.

In each of the above-described exemplary embodiments, as a preferred example, the central portions of the two arm waveguides 8 and 9 of the first MZI 4 are close to each other and the central portions of the two arm waveguides 12 and 13 of the second MZI 5 are close to each other. However, the invention is not limited thereto. For example, the invention can be applied to a delay demodulation device in which the central portions of the two arm waveguides 8 and 9 of the first MZI 4 extend in parallel at a position where they are separated from each other and the central portions of the two arm waveguides 12 and 13 of the second MZI 5 extend in parallel at a position where they are separated from each other.

In each of the above-described exemplary embodiments, the optical path length L1 of the arm waveguide 9 is greater than the optical path length L2 of the arm waveguide 13, the first to fourth light output waveguides 21 to 24 have the same optical path length, and the length of the waveguide 15 is L1-L2 greater than that of the waveguide 14. However, the invention is not limited thereto. That is, in the first exemplary embodiment, the invention can be applied to a delay demodulation device in which the optical path length L1 of the arm waveguide 9 is greater than the optical path length L2 of the arm waveguide 13 and the sum of the optical path lengths of the waveguide 15 and the third and fourth light output waveguides 23 and 24 is L1-L2 greater than the sum of the optical path lengths of the waveguide 14 and the first and second light output waveguides 21 and 22.

Similarly, in the second exemplary embodiment, the invention can be applied to a delay demodulation device in which the optical path length L1 of the arm waveguide 9 is greater than the optical path length L2 of the arm waveguide 13 and the sum of the optical path lengths of the waveguide 15 and the third and fourth light output waveguides 23 and 24 is L1-L2 greater than the sum of the optical path lengths of the waveguide 14 and the first and second light output waveguides 21 and 22.

In the first, second and third exemplary embodiments, the Y-branch waveguide is used as the optical splitter, but the invention is not limited thereto. Any coupler may be used as long as it can substantially equally divide input light. For example, various kinds of couplers, such as a directional coupler, a multi-mode interferometer coupler, and a wavelength-independent coupler using an MZI, may be used. Among them, it is preferable to use a coupler capable of obtaining the same branch ratio in a wide band.

In each of the above-described exemplary embodiments, as a preferred example, two wave plates, that is, the first wave plate 47 and the second wave plate 70 are inserted, but the invention is not limited thereto. Only the first wave plate 47 may be inserted according to, for example, the birefringence of the waveguide, the amount of polarization in the coupler, and the polarization efficiency of the wave plate. Alternatively, the first wave plate 47 may not be provided according to, for example, the birefringence of the waveguide, the amount of polarization in the coupler, and the polarization efficiency of the wave plate.

What is claimed is:

1. A Planar Lightwave Circuit (PLC)-type delay demodulation circuit comprising:
    a planar lightwave circuit that is formed on one PLC chip and demodulates a Differential Quadrature Phase Shift Keying (DQPSK)-modulated optical signal,
    wherein the planar lightwave circuit includes:
    an optical splitter that branches the DQPSK-modulated optical signal into two optical signals; and
    first and second Mach-Zehnder Interferometers (MZIs) that delay the branched optical signals by one bit so as to interfere with each other,
    wherein the length of a short delay line of the first MZI is different from the length of a short delay line of the second MZI, and the length of an optical path from the optical splitter to an output end of the first MZI through the short delay line of the first MZI is equal to that of an optical path from the optical splitter to an output end of the second MZI through the short delay line of the second MZI,
    wherein a first half-wave plate is inserted in a central portion of the short delay line of the first MZI and a central portion of the short delay line of the second MZI, and
    wherein a second half-wave plate is inserted at a position that deviates from the central portion of the short delay line of the first MZI and a position that deviates from the central portion of the short delay line of the second MZI.

2. The PLC-type delay demodulation circuit according to claim 1,
    wherein the planar lightwave circuit further includes:
    two input waveguides that are branched from the optical splitter and are connected to input couplers of the first and second MZIs;
    first and second light output waveguides that extend from an output coupler of the first MZI to the output ends thereof; and
    third and fourth light output waveguides that extend from an output coupler of the second MZI to the output ends thereof,
    wherein an optical path length L1 of the short delay line of the first MZI is greater than an optical path length L2 of the short delay line of the second MZI, and the sum of the optical path lengths of one of the two input waveguides and the third and fourth light output waveguides is L1-L2 greater than the sum of the optical path lengths of the other one of the two input waveguides and the first and second light output waveguides.

3. The PLC-type delay demodulation circuit according to claim 2,
    wherein the length of the one input waveguide is L1-L2 greater than the length of the other input waveguide, and the optical path lengths of the first and second light output waveguides and the optical path lengths of the third and fourth light output waveguides are equal to each other.

4. The PLC-type delay demodulation circuit according to claim 3,
    wherein each of the two input waveguides is a U-shaped waveguide including a curved waveguide.

5. The PLC-type delay demodulation circuit according to claim 4,
    wherein the one input waveguide is arranged along the other input waveguide outside the other input waveguide.

6. The PLC-type delay demodulation circuit according to claim 2,
    wherein the two input waveguides have the same optical path length, and the optical path length of each of the third and fourth light output waveguides is L1-L2 greater than the optical path length of each of the first and second light output waveguides.

7. The PLC-type delay demodulation circuit according to claim 2,
    wherein each of the input couplers and the output couplers of the first and second MZIs is a 3-dB coupler having two inputs and two outputs, and each of the two input waveguides is connected to one of two input ends of the input couplers on the same side.

8. The PLC-type delay demodulation circuit according to claim 2,
    wherein each of the input couplers and the output couplers of the first and second MZIs is a Wavelength Insensitive Coupler.

9. The PLC-type delay demodulation circuit according to claim 1,
    wherein two delay lines of the first MZI and two delay lines of the second MZI are formed in the same region of the planar lightwave circuit such that the short delay line of the first MZI and a long delay line of the second MZI intersect each other at four points.

10. The PLC-type delay demodulation circuit according to claim 9,
wherein the first half-wave plate has a main axis that is inclined at an angle of 45 degrees with respect to a refractive index main axis of the delay lines and is inserted in central portions of the two delay lines of the first MZI and central portions of the two delay lines of the second MZI.

11. The PLC-type delay demodulation circuit according to claim 10,
wherein the second half-wave plate has a main axis that is parallel or horizontal to the refractive index main axis of the delay lines and is inserted at a position that deviates from the central portions of the two delay lines of the first MZI to an output side and a position that deviates from the central portions of the two delay lines of the second MZI to the output side.

12. The PLC-type delay demodulation circuit according to claim 9,
wherein the central portions of the two delay lines of the first MZI extend in parallel so as to be close to each other, and the central portions of the two delay lines of the second MZI extend in parallel so as to be close to each other.

13. An optical receiver comprising;
the PLC-type delay demodulation circuit according to claim 1 that receives a DQPSK modulated optical signal and then outputs four light intensity signals;
a balanced receiver that receives the four light intensity signals outputted from the PLC-type delay demodulation circuit and then converts the four light intensity signals into electric signals;
an electric circuit that receives and decodes the electric signals outputted from the balanced receiver.

* * * * *